United States Patent [19]

Mochizuki et al.

[11] Patent Number: 5,435,147
[45] Date of Patent: Jul. 25, 1995

[54] AIR CONDITIONING CONTROL SYSTEM

[75] Inventors: Masamichi Mochizuki, Fujinomiya; Keiji Sato, Shizuoka; Takashi Kato, Fujieda; Miki Isikawa, Shimizu; Tatsuya Sugiyama, Shizuoka, all of Japan

[73] Assignees: Hitachi, Ltd., Tokyo; Hitachi Shimizu Engineering Co., Ltd., Shiruoka, both of Japan

[21] Appl. No.: 193,851

[22] Filed: Feb. 9, 1994

[30] Foreign Application Priority Data

Feb. 16, 1993 [JP] Japan .................. 5-026473

[51] Int. Cl.⁶ .................. F25B 7/00; G05D 23/00
[52] U.S. Cl. .................. 62/175; 165/22; 236/51
[58] Field of Search .............. 236/51; 165/22; 62/175; 417/5

[56] References Cited

U.S. PATENT DOCUMENTS

| | | | |
|---|---|---|---|
| 4,313,560 | 2/1982 | Stiles | 165/22 X |
| 4,829,779 | 5/1989 | Munson et al. | 62/175 |
| 5,279,458 | 1/1994 | De Wolf et al. | 236/51 X |

Primary Examiner—William E. Wayner
Attorney, Agent, or Firm—Antonelli, Terry, Stout & Kraus

[57] ABSTRACT

An air conditioning control system ensuring the desired full utility so that the operation of a plurality of air conditioners installed in a building can be controlled and monitored at a plurality of spots in the building. The air conditioning control system includes a building's central monitor board controlling and monitoring the operation of the individual air conditioners, and a centralized control unit relaying air conditioner control information outputted from the central monitor board and information indicating the operation status of the individual air conditioners, each of the central monitor board and the centralized control unit including an input part inputting the control information to the individual air conditioners and a display part displaying the operation status information regarding the individual air conditioners. The centralized control unit further includes a decision part deciding to identify newest control information inputted from the input part of each of the central monitor board and the centralized control unit and a transmitter part transmitting this newest control information to the individual air conditioners.

12 Claims, 3 Drawing Sheets

AIR CONDITIONING CONTROL SYSTEM

BACKGROUND OF THE INVENTION

This invention relates to an air conditioning control system for controlling the operation of a group of air conditioners installed in a building, and more particularly to a control system of the kind described above which is suitable for controlling the operation of such an air conditioner group from a plurality of spots in the building.

Air conditioning control systems used hitherto for controlling the operation of a group of air conditioners installed in a building are broadly classified into two types. In one type of the air conditioning control system, the power, lighting equipments, elevators, air conditioners, etc. are collectively controlled by monitoring a central monitor board in the building, and the individual air conditioners are controlled to operate according to an operation control signal applied from the building's central monitor board. In this case, the operation control signal outputted from the building's central monitor board is transmitted to a relay located at a position remote from the central monitor board, and the relay acts to identify which air conditioner is to be controlled by what kind of the operation control signal, and the operation control signal is transmitted to the desired air conditioner to operate the air conditioner. In another type of the air conditioning control system, the operation of the individual air conditioners is controlled by an operation control signal inputted from a centralized air conditioner control unit installed in the building. In this case, the operation control signal from the centralized air conditioner control unit is identified by the centralized control unit itself to be transmitted to a desired air conditioner. Thus, the operation of the individual air conditioners can be controlled in the latter control system.

It will be seen from the above description that, in the case of the prior art air conditioning control systems controlling the air conditioner group, the operation of the air conditioner group was controlled at a single spot only in the building.

As the scale of the building becomes larger, it is apparent that the total number of the air conditioners installed in the building becomes also larger. In such a case, or when the operation of all of air conditioners installed in a plurality of buildings is to be collectively controlled from a single spot only, that is, for example, by a building's central monitor board installed in a control building, trouble occurring in the building's central monitor board will exert a great influence on the operation of the control system. Therefore, in such an event, it becomes necessary to minimize such an undesirable influence attributable to the trouble.

Another air conditioning control system is disclosed in JP-A-Sho61-202040. According to the disclosure of the cited application, each of individual air conditioners installed in a building is provided with a remote controller which is designed so as not to respond to an instruction signal from a central control unit, and each of the individual air conditioners is controlled to start and stop according to an instruction signal from the associated remote controller.

However, in the case of the control system disclosed in the cited application, each of the individual air conditioners cannot be controlled from the central control unit because the associated remote controller is designed so as not to respond to the instruction signal from the central control unit. Therefore, in the case of the building having many air conditioners, the operation of the control system tended to become uneconomical and unsafe.

SUMMARY OF THE INVENTION

With a view to obviate such undesirable situations, it is an object of the present invention to provide an air conditioning control system in which, in addition to a building's central monitor board, a centralized control unit connected between the central monitor board and a group of air conditioners is also provided with the function of controlling the operation of the air conditioners, so that the operation of the air conditioners can be controlled from a plurality of spots in the building.

According to the present invention which attains the above object, there is provided an air conditioning control system comprising a building's central monitor board controlling and monitoring the operation of a plurality of air conditioners, and a centralized control unit acting as relay means for transmitting air conditioner control information outputted from the central monitor board to the individual air conditioners and acting also as relay means for transmitting air conditioner operation status information outputted from the individual air conditioners to the central monitor board, the centralized control unit being provided with the function of controlling the operation of the individual air conditioners in addition to the central monitor board.

That is, an embodiment of the air conditioning control system of the present invention comprises a building's central monitor board and a centralized control unit, the central monitor board including first input means for inputting control information to individual air conditioners, first memory means for storing both the control information inputted from the first input means and operation status information inputted from the individual air conditioners, first display means for displaying the operation status information stored in the first memory means, and first transmission means for receiving and transmitting both the control information and the operation status information, and the centralized control unit including second memory means for storing both the control information and the operation status information transmitted from the first transmission means, second input means for inputting control information to the individual air conditioners, decision means for deciding whether to update the control information stored in the second memory means by replacing the control information stored already in the second memory means by the control information inputted from the second input means when the result of the comparison between the control information inputted from the second input means and the control information stored already in the second memory means proves that the control information inputted from the second input means differs from the control information stored already in the second memory means, the decision means acting to update the control information stored in the second memory means each time the control information is transmitted from the first transmission means, second transmission means for transmitting the control information stored in the second memory means to the individual air conditioners and receiving the operation status information from the individual air conditioners, and second display means for displaying the operation status information stored in the second memory means.

The plural air conditioners include at least one pair type air conditioner and/or at least one multi type air conditioner. The control information preferably includes information regarding the air conditioner start-stop timing, information regarding the air conditioning operation modes and information regarding the temperature settings. The operation status information preferably includes information regarding whether the air conditioners are under operation or not and information regarding the air conditioning operation modes. The second transmission means periodically receives and transmits the control information and the operation status information with predetermined timing.

Another embodiment of the air conditioning control system according to the present invention is a modification of the first embodiment of the air conditioning control system in that, in addition to the components of the first embodiment, a plurality of gateways each including third transmission means for receiving and transmitting the control information are located between the centralized control unit and the air conditioner groups formed by grouping the air conditioners. Each of these gateways receives the operation status information from the corresponding air conditioner group and transmits the information to the second transmission means. It is preferable to provide buffer memory means in each of the gateways for temporarily storing the operation status information from the associated air conditioner group.

In the first embodiment of the air conditioning control system of the present invention, the first input means in the building's central monitor board is used to input the control information for the individual air conditioners, and the first memory means stores the inputted control information together with the operation status information from the individual air conditioners. The first display means displays the operation status information stored in the first memory means, and the first transmission means receives and transmits both the control information and the operation status information. On the other hand, in the centralized control unit, the second memory means stores the control information and the air conditioner operation status information transmitted from the first transmission means in the central monitor board. When the control information is inputted from the second input means to the individual air conditioners, the decision means compares the newest control information now inputted with the control information stored already in the second memory means. When the control information stored already in the second memory means differs from the newest control information inputted from the second input means, the decision means decides to update the control information stored in the second memory means by replacing the former control information by the latter control information. The decision means acts also to update the control information stored in the second memory means each time the control information is transmitted from the first transmission means, and the second transmission means transmits the control information stored in the second memory means to the individual air conditioners. The control information stored in the second memory means is transmitted at predetermined timing, and the newest control information inputted from the central monitor board or the centralized control unit is stored in the second memory means, so that the operation of the individual air conditioners can be controlled from each of the building's central monitor board and the centralized control unit.

The second embodiment of the air conditioning control system of the present invention operates in a manner similar to that of the first embodiment of the air conditioning control system, because gateways only are added to the latter control system. The gateways are useful for controlling the air conditioners divided into a plurality of groups. The control information from the centralized control unit is transmitted through each gateway to the corresponding air conditioner group, and the operation status information from the associated air conditioner group is transmitted through the gateway to the centralized control unit. The use of the gateways is advantageous in that the scale of the air conditioner system can be easily expanded. The buffer memory means stores temporarily the operation status information from the associated air conditioner group thereby smoothing the flow of the information between the centralized control unit and the individual air conditioners.

DESCRIPTION OF THE PREFERRED EMBODIMENTS

The structure and operation of an embodiment of the air conditioning control system according to the present invention will now be described by reference to FIGS. 1 to 4.

Figure 1:
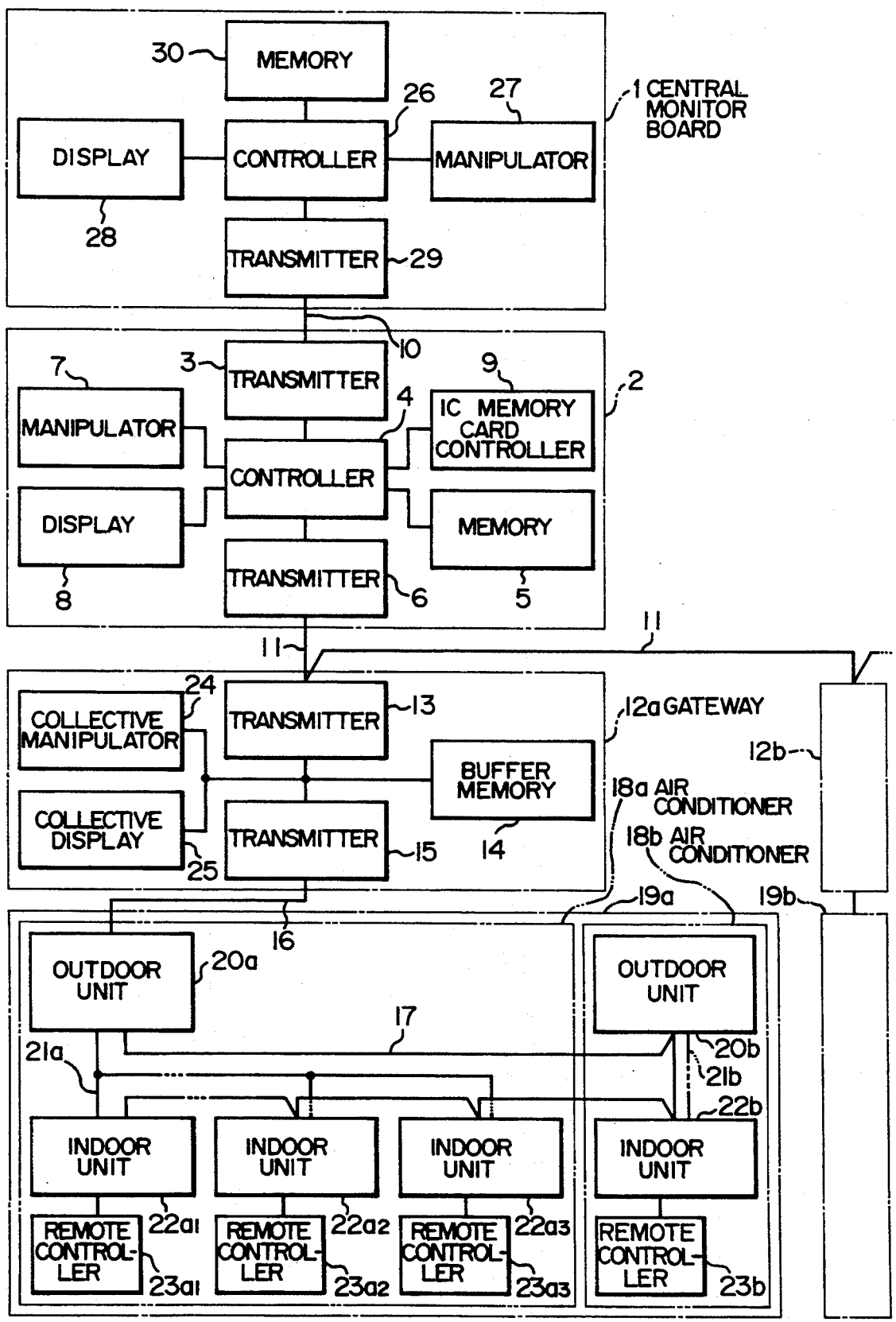
FIG. 1 is a block diagram showing the structure of an embodiment of the air conditioning control system of the present invention.
Figure 2:
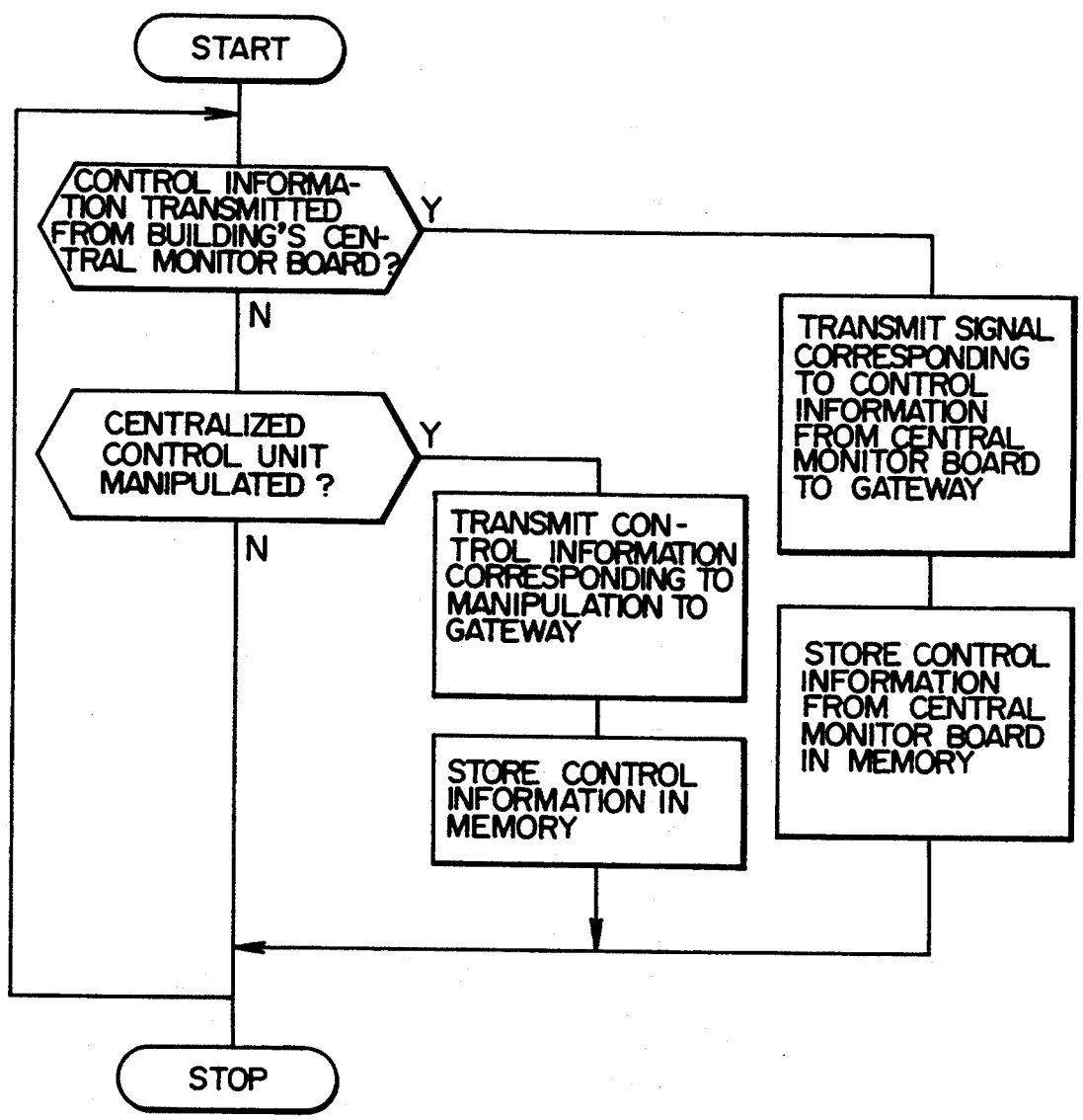
FIG. 2 is a flow chart showing the sequence of information processing by the centralized control unit shown in the FIG. 1.
Figure 3:
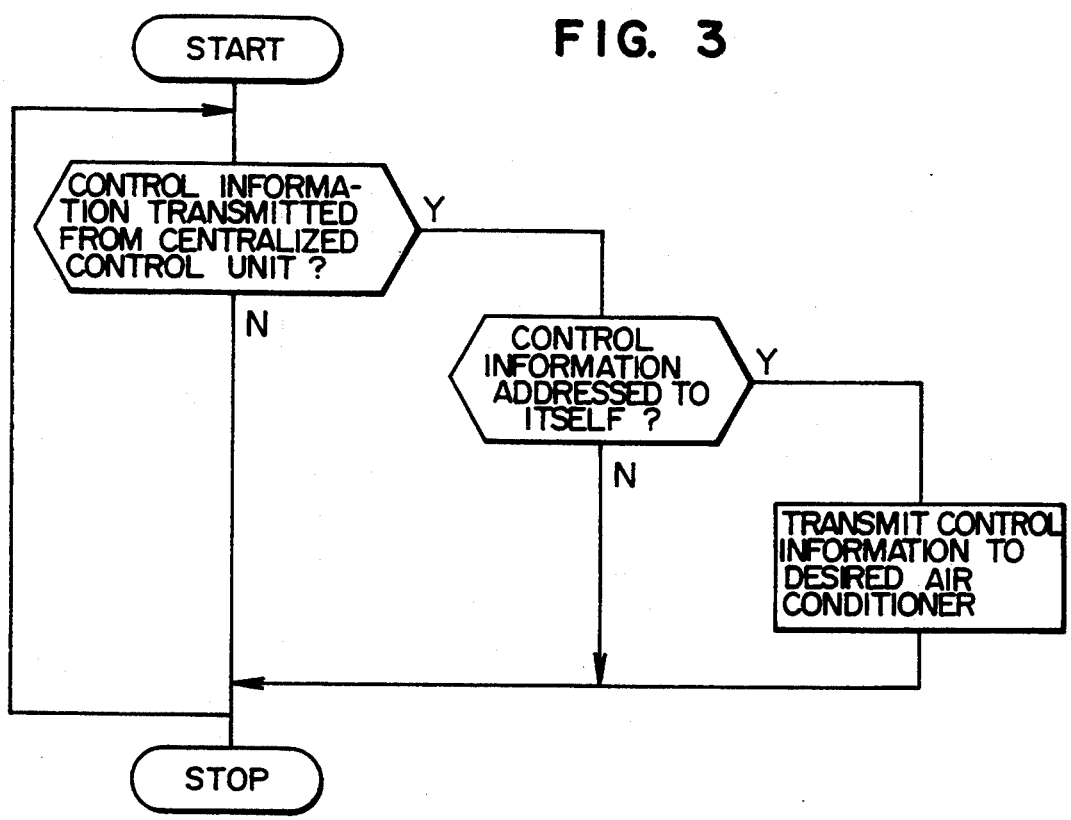
FIG. 3 is a flow chart showing the sequence of information processing by each of the gateways shown in FIG. 1.
Figure 4:
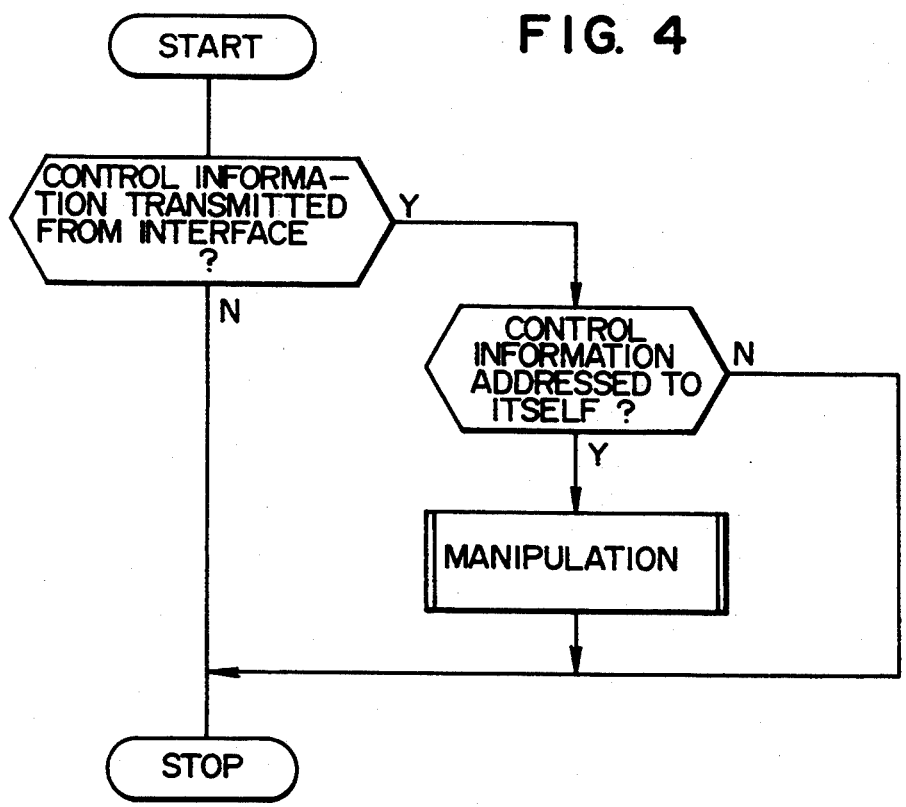
FIG. 4 is a flow chart showing the sequence of information processing by each of the air conditioner outdoor units shown in FIG. 1.

FIG. 1 is a block diagram showing the structure of an embodiment of the air conditioning control system of the present invention. FIGS. 2 to 4 are flow charts showing the sequence of information processing by the centralized control unit, gateways and air conditioner outdoor units, respectively, which are components of the air conditioning control system of the present invention.

As shown in FIG. 1, the air conditioning control system embodying the present invention is generally composed of a building's central monitor board 1, a centralized control unit 2 connected to the central monitor board 1 by a signal line 10, a plurality of gateways 12 connected in parallel to the centralized control unit 2 by a signal line 11, and a group 19 of air conditioners 18 connected to the gateways 12 by signal lines 16. Each of the air conditioners 18 consists of the combination of one outdoor unit 20 and one or more indoor units 22.

The building's central monitor board 1 includes a manipulator part 27 manipulated to input control information for controlling the individual air conditioners 18, a display part 28 displaying the operation status of the individual air conditioners 18 on the basis of operation status information transmitted from the individual air conditioners 18, an information transmission circuit 29 receiving and transmitting information including the control information and the operation status information, a memory 30 storing the received and transmitted information, and a control part 26 carrying out analysis of the information, etc. The control information outputted from the central monitor board 1 is transmitted through the centralized control unit 2 and the gateway 12a to control the entire air conditioner group 19a or the individual air conditioners 18a and 18b in the air conditioner group 19a or the indoor units 22a and 22b of the air conditioners 18a and 18b in the air conditioner group 19a. Further, the central monitor board 1 transmits the control information through the other gateways 12b . . . connected in parallel to the gateway 12a so as to similarly control the air conditioner groups 19b . . . connected to the gateways 12b . . . The control information outputted from the central monitor board 1 for controlling the air conditioner group 19a, or the individual air conditioners 18a and 18b in the group 19a, or the indoor units 22a and 22b of the individual air conditioners 18a and 18b includes start-stop control information, operation mode change-over information, temperature setting alteration information, and start-stop schedule control information.

The centralized control unit 2 includes an information transmission circuit 3 provided for exchange of information between the central monitor board 1 and the centralized control unit 2, a manipulator part 7 manipulated for inputting control information including start-stop control information, operation mode change-over information and temperature setting alteration information for the air conditioner group 19a, or the individual air conditioners 18a and 18b in the air conditioner group 19a, or the indoor units 22a and 22b of the air conditioners 18a and 18b, a display part 8 displaying the operation status of the air conditioner group 19a, or the individual indoor units 22a and 22b of the air conditioners 18a and 18b in the air conditioner group 19a, that is, displaying whether the air conditioner group 19a or the indoor units 22a and 22b are under operation or not, whether the operation for cooling or heating is being done and whether the operation is normal or abnormal, a memory 5 storing the control information and the operation status information, another information transmission circuit 6 receiving and transmitting the information through the gateway 12a and the signal line 11, an IC memory card control part 9 reading and writing information from and on an IC memory card, and a control part 4 functioning to control the entire centralized control unit 2 and to make information analysis.

The IC memory card control part 9 reads an IC memory card storing information regarding grouping of the air conditioners and data of various settings, for example, air conditioner start-stop control data and operation mode data and periodically writes, on the IC memory card, the operation status information, the refrigeration cycle information, etc. regarding the air conditioners at predetermined timing. When another IC memory card is inserted, the IC memory card control part 9 reads from the IC memory card the control program for the centralized control unit 2 and alters the control program for the air conditioner groups according to the stored control program.

The gateway 12a acts as a relay interposed between the centralized control unit 2 and the air conditioner group 19a. The gateway 12a includes an information transmission circuit 13 transmitting and receiving the information to and from the centralized control unit 2 through the signal line 11, another information transmission circuit 15 transmitting and receiving the information to and from the air conditioner group 19a through the signal line 16, and a buffer memory 14 continuously receiving the operation status information regarding the air conditioner group 19a or regarding the individual indoor units 22a1, 22a2 and 22a3 in the air conditioner group 19a and storing the received operation status information. The maximum number of the gateways 12 that can be connected to the centralized control unit 2 is 16 (the fourth power of 2). These gateways 12 are successively interconnected with each other by the signal line 11 to be connected to the centralized control unit 2. Each of the gateways 12 is connected to one of the outdoor units 20 in each of the air conditioner groups 19.

Each air conditioner group 19 consists of a maximum of sixteen air conditioners 18, and these air conditioners 18 are of the pair type and/or the multi type. In the air conditioner of the pair type, one indoor unit 22 is connected to one outdoor unit 20, while in the air conditioner of the multi type, a plurality of indoor units 22 are connected to one outdoor unit 20. Respectively different air conditioner addresses are allocated to the individual air conditioners 18, and, in the case of the multi type air conditioners 18, respectively different indoor unit addresses are allocated to the indoor units 22. The outdoor units 20 are interconnected with each other and then with the indoor units 22 by the signal line 17, and the indoor units 22 are also interconnected with each other by the signal line 17 so as to form a signal circuit. In the illustrated embodiment, the air conditioner group 19a consists of one multi type air conditioner 18a and one pair type air conditioner 18b.

In FIG. 1, the multi type air conditioner 18a includes one outdoor unit 20a, three indoor units 22a1, 22a2, 22a3, and remote controllers 23a1, 23a2, 23a3 connected to the indoor units 22a1, 22a2, 22a3 respectively. The outdoor unit 20a is connected to the indoor units 22a1 to 22a3 by a refrigerant piping 21a to establish a refrigeration cycle between the outdoor unit 20a and the indoor units 22a1 to 22a3. The pair type air conditioner 18b includes one outdoor unit 20b, one indoor unit 22b and one remote controller 23b connected to the indoor unit 22b, and the outdoor unit 20b and the indoor unit 22b are connected by a refrigerant piping 21b to establish a refrigeration cycle between the outdoor unit 20b and the indoor unit 22b.

The exchange of the information between the outdoor unit 20a and the indoor units 22a1 to 22a3 in the multi type air conditioner 18a and also the exchange of the information between the outdoor unit 20b and the indoor unit 22b in the pair type air conditioner 18b are made through the signal line 17. All of the outdoor units 20a, 20b, the indoor units 22a1, 22a2, 22a3, 22b, and the remote controllers 23a1, 23a2, 23a3, 23b that are the components of the multi type and pair type air conditioners 18a and 18b are controlled by microcomputers.

The operation of the individual components of the first embodiment of the air conditioning control system of the present invention will now be described.

As soon as the centralized control unit 2 receives the control information from the building's central monitor board 1 through the information transmission circuit 3, the control part 4 that acts as the decision means analyzes the content of the control information and compares the received control information with the control information stored already in the memory 5. When the received control information differs from the control information stored already in the memory 5, the received control information is transmitted from the information transmission circuit 6 to each gateway 12. At the same time, the control information stored in the memory 5 is updated by replacing the control information stored already in the memory 5 by the received control information. On the other hand, the operation status information regarding each air conditioner group 19 or the individual indoor units 22 in each air conditioner group 19 is received by the information transmission circuit 6 through each gateway 12. The received operation status information is stored in the memory 5 and, at the same time, transmitted to the central monitor board 1 through the information transmission circuit 3. Also, as soon as the operation status information is received, the display part 8 is instructed from the control part 4 to display the operation status of each of the individual indoor units 22. Information regarding the position where the operation status of each air conditioner 18 is to be displayed on the display part 8 is stored beforehand in the IC memory card, and the stored position information is read out by the IC memory card control part 9 to be stored in the memory 5 through the control part 4 in the centralized control unit 2.

Suppose that the building manager manipulates the manipulator part 7 to effect the start-stop control of the air conditioner groups 19 or the individual indoor units 22 in the air conditioner groups 19, to change over the operation mode and/or to alter the temperature settings. In this case, only when the control information differs from the control information stored already in the memory 5, the control information is transmitted from the information transmission circuit 6 to the gateways 12. The transmitted control information is stored in the memory 5 through the control part 4 in the centralized control unit 2. The area for storing the control information in the memory 5 is the same as the area storing the control information transmitted from the building's central monitor board 1, so that the newer control information is stored in the memory 5 to be transmitted to the gateways 12. FIG. 2 is a flow chart showing the sequence of processing the control information in the centralized control unit 2.

As shown in FIG. 3, as soon as the control information is supplied from the centralized control unit 2, each gateway 12 fetches the information pertaining to itself and transmits that information to the air conditioners 18 connected to itself, and the information not pertaining to itself is transmitted to other gateways 12. The gateway 12 acting as the information relay means includes the buffer memory 14. The gateway 12 continuously receives the operation status information regarding the associated air conditioner group 19 or the individual indoor units 22 in the air conditioner group 19 to store the operation status information in its buffer memory 14. Thus, the gateway 12 can transmit the information to the centralized control unit 2 in real time relation.

The operation of the multi type air conditioner 18a in the air conditioner group 19a is started or stopped as desired by manipulation of the remote controllers 23a1 to 23a3 connected to the indoor units 22a1 to 22a3 respectively. When, for example, the remote controller 23a1 is manipulated to instruct "operation" the operation of the indoor unit 22a1 is started, and the operation instruction is transmitted from the indoor unit 22a1 to the outdoor unit 20a through the signal line 17 to start the operation of the outdoor unit 20a. The operation of the pair type air conditioner 18b is similarly started and stopped by manipulation of the remote controller 23b. Each of these remote controllers 23 includes a control part, a memory, a manipulator part, a display part and a transmission circuit. The control part of the remote controller 23 identifies the operation information provided by manipulation of the manipulator part, and the detail of the operation information is displayed on the display part and stored in the memory.

In the meantime, the control information transmitted from the gateway 12a to the air conditioner group 19a or to the individual outdoor units 20a, 20b and the individual indoor units 22a1, 22a2, 22a3 and 22b in the air conditioner group 19a is transmitted to the outdoor unit 20a of the multi type air conditioner 18a through the signal line 16. As shown in FIG. 4, the outdoor unit 20a fetches internally the control information addressed to itself, and the information except that addressed to itself is subjected to the protocol conversion by the microcomputer of the outdoor unit 20a to be transmitted through the signal line 17 to the indoor units 22a1 to 22a3 or to the outdoor unit 20b or the indoor unit 22b of the pair type air conditioner 18b. Because the air conditioner address and the indoor unit addresses are allocated to the outdoor unit 20b and the indoor units 22a1 to 22a3 and 22b respectively, the control information addressed to themselves only among those transmitted through the signal line 17 is fetched, and the remaining unnecessary information is discarded. Thus, each of the outdoor units and each of the indoor units operate according to the control information addressed to themselves respectively.

The application of the first embodiment of the air conditioning control system having the above structure will now be described.

In a building to which the present invention is applied, the building's central monitor board 1 is installed in a computer room, the centralized control unit 2 is installed in a building manager room, the gateways 12a, 12b, . . . are installed on the individual floors respectively, the outdoor units 20a, 20b, . . . are installed on the roof, and the indoor units 22a1, 22a2, . . . and the remote controllers 23a1, 23a2, . . . are installed in the individual rooms respectively. All the air conditioners 18 in the building are activated at 8:00 A.M. and are stopped at 17:00 P.M. During the above period, a person in each room manipulates the remote controller 23 in that room to start and stop the operation of the indoor unit 22 in that room as desired. After 17:00 P.M., the building manager checks whether or not a person is present in any one of the rooms, and, when he detects that the indoor unit 22 is not turned off in a room where no one is present, he turns off that indoor unit 22 by manipulating the centralized control unit 2.

By way of example, the manner of start-stop control for the indoor unit 22a1 according to the present invention will now be described.

First, at 8:00 A.M., the "operation" information is automatically transmitted from the control part 26 of the building's central monitor board 1 to the centralized control unit 2 according to the start-stop schedule stored in the memory 30. That information can also be transmitted by means of manipulation of the manipulator part 27 by the building manager. The centralized control unit 2 stores the "stop" information in the memory 5 as an initial value. As soon as the centralized control unit 2 receives the "operation" information, the centralized control unit 2 stores the received "operation" information in the memory 5 as the control information and, at the same time, transmits the "operation" information to the gateway 12a. The gateway 12a transmits the "operation" information to the outdoor unit 20a, and the outdoor unit 20a transmits the "operation" information to the indoor unit 22a1, thence to the remote controller 23a1. As soon as the remote controller 23a1 receives the "operation" information, the "operation" mode is displayed, and both the indoor unit 22a1 and the outdoor unit 20a start to operate. The operation status information indicating the operation of the units 22a1 and 20a is transmitted through the inverse route, that is, from the remote controller 23a1 to the centralized control unit 2 through the indoor unit 22a1, the outdoor unit 20a and the gateway 12a to be displayed on the display part 8. When the centralized control unit 2 does not receive the operation status information from the remote controller 23a1 within a predetermined period after the "operation" information is transmitted from the centralized control unit 2 to the gateway 12a, the centralized control unit 2 decides that a start-stop error has occurred and executes error processing including generation of an alarm signal. Further, the centralized control unit 2 transmits the operation status information and the start-stop error signal to the building's central monitor board 1.

After the activation at 8:00 A.M., the operation of the indoor unit 22a1 is started and stopped as desired under control of the remote controller 23a1 in that room. Each time the operation of the indoor unit 22a1 is started and stopped, the operation status information indicating that the indoor unit 22a1 is under operation or not is transmitted from the remote controller 23a1 to the centralized control unit 2 through the indoor unit 22a1, the outdoor unit 20a and the gateway 12a. The centralized control unit 2 transmits the operation status information to the central monitor board 1 while displaying that information on the display part 8.

At 17:00 P.M., the "stop" information is transmitted to the centralized control unit 2 automatically or by manipulation by the building manager, and processing for stopping the air conditioners 18 is executed in a manner similar to the air conditioner activation processing done at 8:00 A.M.

After 17:00 P.M., the indoor unit 22a or 22b in each room can be freely started and stopped by the remote controller 23a or 23b in that room. When the indoor unit 22a or 22b is still under operation after no one is present in that room, the operation status information regarding this indoor unit 22a or 22b is displayed on the display part 8 of the centralized control unit 2. In this case, the building manager manipulates the manipulator part 7 of the centralized control unit 2 to stop the operation of the indoor unit 22a or 22b.

The start-stop schedule is controlled in a manner which will be described now.

The air conditioner start-stop schedule is inputted to the building's central monitor board 1. The daily or weekly detail of the start-stop schedule is transmitted to the centralized control unit 2 from the central monitor board 1. The centralized control unit 2 stores the transmitted daily or weekly detail of the start-stop schedule in the memory 5, and, according to the scheduled timing of the start-stop schedule, transmits the "operation" information or the "stop" information to each air conditioner group 19 or to the indoor units 22 of the air conditioners 18 in the air conditioner group 19 through the corresponding gateway 12.

The first embodiment of the air conditioning control system of the present invention described above provides the following advantages:

(1) The air conditioners 18 or the indoor units 22 of the air conditioners 18 can be started and stopped from both the building's central monitor board 1 and the centralized control unit 2 as from well as the remote controllers 23 in the individual rooms as desired.

(2) The centralized control unit 2 can carry out the air conditioner start-stop control by receiving the detail of the air conditioner start-stop schedule from the building's central monitor board 1, so that the load required for the processing by the central monitor board 1 can be alleviated.

(3) The control program to be executed by the centralized control unit 2 can be easily changed by exchanging the IC memory card inserted in the IC memory card control part 9, so that the centralized control unit 2 can be easily connected to central monitor boards 1 of other buildings.

(4) The number of the gateways 12 that can be connected to the centralized control unit 2 is sixteen at the maximum, so that the air conditioning control system can be constructed at a reasonable cost according to the scale of the air conditioner system.

(5) Because only one air conditioner group 19 is connected to one gateway 12, failure of one gateway 12 does not adversely affect the operation of other air conditioner groups 19. Further, even when one gateway 12 may be disabled, the air conditioners 18 connected to that gateway 12 can be operated by the remote controllers 23 in the individual rooms, so that the risk of stoppage of all the air conditioners 18 connected to that gateway 12 can be minimized.

(6) By merely wiring to connect one gateway 12 to the outdoor units 20 in each air conditioner group 19, the operation of all of the outdoor units 20 and the indoor units 22 can be controlled without requiring any complex wiring.

Another embodiment of the air conditioning control system according to the present invention will now be described. This second embodiment is a modification of the first embodiment in that the gateway 12 further includes a collective manipulator part 24 and a collective display part 25. Thus, besides the generation of the "operation" information and the "stop" information from the building's central monitor board 1 and the centralized control unit 2, manipulation of the collective manipulator part 24 can effect the start-stop control of the air conditioner groups 19 or the individual indoor units 22 in the air conditioner groups 19.

The second embodiment of the air conditioning control system provides, in addition to the aforementioned advantages (1) to (6), such another advantage that, because of the provision of the collective manipulator part 24 and the collective display part 25, the start-stop control of the indoor units 22 can be effected at the locations of the gateways 12, for example, at the individual floors of the building.

In the aforementioned first and second embodiments of the present invention, the signal lines may be of either the wired type or the wireless type. Also, it is apparent that the IC memory card may be replaced by any other suitable memory means.

It will be understood from the foregoing description that, in the first embodiment of the air conditioning control system according to the present invention, each of the building's central monitor board and the centralized control unit includes the input means for inputting the control information for controlling the individual air conditioners and the display means for displaying the operation status information regarding the individual air conditioners, and the centralized control unit further includes the decision means for deciding to identify the newest control information inputted from the input means of either the building's central monitor board or the centralized control unit and the information transmission means for transmitting this newest control information to the individual air conditioners. Therefore, the operation of the individual air conditioners can be controlled and monitored from each of the building's central monitor board and the centralized control unit, so that the air conditioning control system can be operated without any delay attributable to possible failure of its part or parts. Thus, the utility of the air conditioning control system can be improved.

It will be also understood from the foregoing description that the second embodiment of the air conditioning control system according to the present invention comprises, in addition to the first embodiment, a plurality of gateways that can be connected to the centralized control unit. Therefore, the operation of the individual air conditioners can be controlled and monitored from each of the building's central monitor board and the centralized control unit and, by merely connecting the air conditioner groups to the gateways, the air conditioning control system can be easily expanded at low costs.

What is claimed is:

1. An air conditioning control system comprising:
a building's central monitor board controlling and monitoring the operation of a plurality of air conditioners; and
a centralized control unit acting as relay means for transmitting air conditioner control information outputted from said central monitor board to the individual air conditioners, acting as a control panel for inputting of air conditioner control information, and acting also as relay means for transmitting air conditioner operation status information outputted from said individual air conditioners to said central monitor board;
said centralized control unit including a controller for controlling the operation of said individual air conditioners and an input manipulator for receiving control commands.

2. An air conditioning control system comprising:
a building's central monitor board controlling and monitoring the operation of a plurality of air conditioners; and
a centralized control unit acting as relay means for transmitting air conditioner control information outputted from said central monitor board to the individual air conditioners and acting also as relay means for transmitting air conditioner operation status information outputted from said individual air conditioners to said central monitor board;
said central monitor board including first input means for inputting said control information to said individual air conditioners, first memory means for storing both said control information inputted from said first input means and said operation status information inputted from said individual air conditioners, first display means for displaying said operation status information stored in said first memory means, and first transmission means for receiving and transmitting both said control information and said operation status information, and
said centralized control unit including second memory means for storing said air conditioner control information and said air conditioner operation status information transmitted from said first transmission means, second input means for inputting said control information to said individual air conditioners, decision means for deciding to update said control information stored in said second memory means by replacing said control information stored already in said second memory means by said control information inputted now from said second input means when the result of comparison between said control information inputted from said second input means and said control information stored already in said second memory means proves that said control information inputted from said second input means differs from said control information stored already in said second memory means, said decision means acting to update said control information stored in said second memory means each time said control information is transmitted from said first transmission means, second transmission means for transmitting said control information stored in said second memory means to said individual air conditioners and receiving said operation status information from said individual air conditioners, and second display means for displaying said operation status information stored in said second memory means.

3. An air conditioning control system according to claim 2, wherein said plural air conditioners include at least one pair type air conditioner and/or at least one multi type air conditioner.

4. An air conditioning control system according to claim 2, wherein said control information includes information regarding the air conditioner start-stop timing, information regarding whether said air conditioners are under operation in the cooling mode or the heating mode and information regarding the temperature settings.

5. An air conditioning control system according to claim 2, wherein said operation status information includes information regarding whether said air conditioners are under operation or not and information regarding whether said air conditioners are under operation in the cooling mode or the heating mode.

6. An air conditioning control system according to claim 2, wherein said second transmission means periodically receives and transmits said control information and said operation status information at predetermined timing.

7. An air conditioning control system comprising:
a building's central monitor board controlling and monitoring the operation of a plurality of air conditioners; and
a centralized control unit acting as relay means for transmitting air conditioner control information outputted from said central monitor board to said individual air conditioners and acting also as relay means for transmitting air conditioner operation status information outputted from said individual air conditioners to said central monitor board;
said central monitor board including first input means for inputting said control information to said individual air conditioners, first memory means for storing both said control information inputted from said first input means and said operation status information inputted from said individual air conditioners, first display means for displaying said operation status information stored in said first memory means, and first transmission means for receiving and transmitting both said control information and said operation status information, and said centralized control unit including second memory means for storing both said control information and said operation status information transmitted from said first transmission means in said central monitor board, second input means for inputting said control information to said individual air conditioners, decision means for deciding to update said control information stored in said second memory means by replacing said control information stored already in said second memory means by said control information inputted now from said second input means when the result of comparison between said control information inputted from said second input means and said control information stored already in said second memory means proves that said control information inputted from said second input means differs from said control information stored already in said second memory means, said decision means acting to update said control information stored in said second memory means each time said control information is transmitted from said first transmission means, second transmission means for transmitting said control information stored in said second memory means, and second display means for displaying said operation status information stored in said second memory means, and a gateway provided for each of a plurality of air conditioner groups formed by grouping said plural air conditioners;

said gateway including third transmission means for receiving and transmitting said control information between said centralized control unit and each of said air conditioner groups.

8. An air conditioning control system according to claim 7, wherein each said air conditioner group includes at least one pair type air conditioner and/or at least one multi type air conditioner.

9. An air conditioning control system according to claim 7, wherein said control information includes information regarding the air conditioner start-stop timing, information regarding whether said air conditioners are under operation in the cooling mode or the heating mode and information regarding the temperature settings.

10. An air conditioning control system according to claim 7, wherein said operation status information includes information regarding whether said air conditioners are under operation or not and information regarding whether said air conditioners are under operation in the cooling mode or the heating mode.

11. An air conditioning control system according to claim 7, wherein said second transmission means periodically receives and transmits said control information and said operation status information at predetermined timing.

12. An air conditioning control system according to claim 7, wherein said gateway includes buffer memory means for temporarily storing said operation status information transmitted from each of said air conditioner groups.

* * * * *